Figure 1:
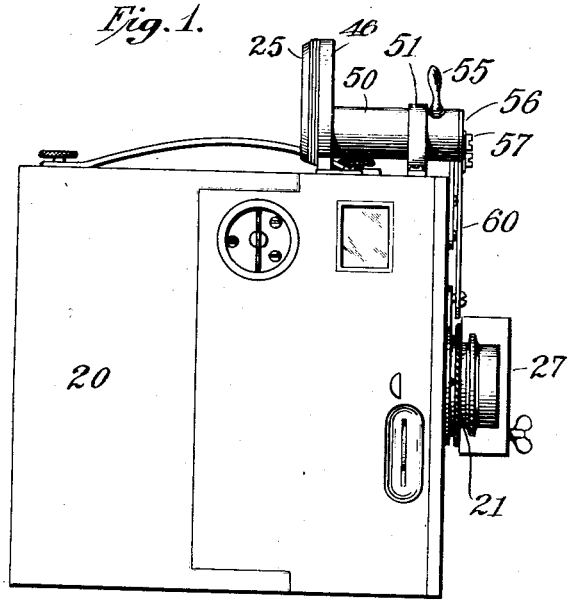

H. HESS.
PHOTOGRAPHIC CAMERA EXPOSING MECHANISM.
APPLICATION FILED FEB. 4, 1916.

1,300,613.

Patented Apr. 15, 1919.
3 SHEETS—SHEET 1.

Henry Hess, Inventor:
by Rogers, Kennedy & Campbell
his Atty's.

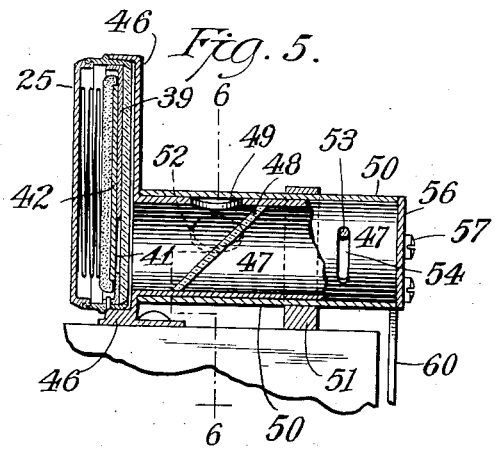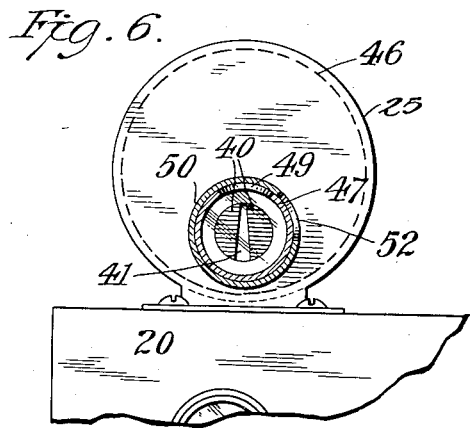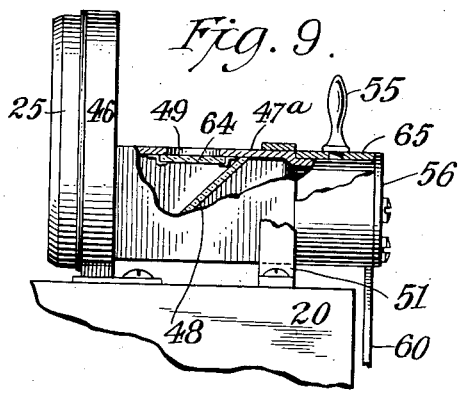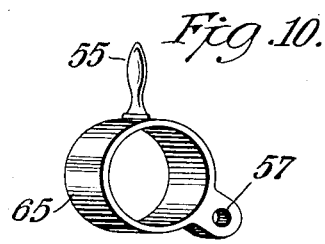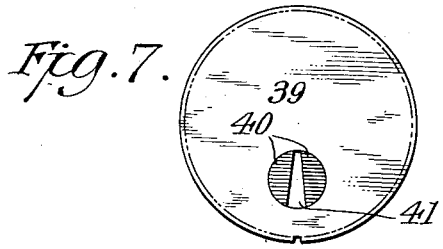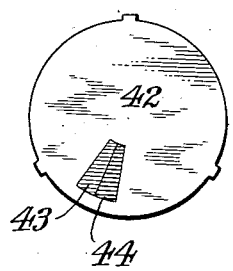

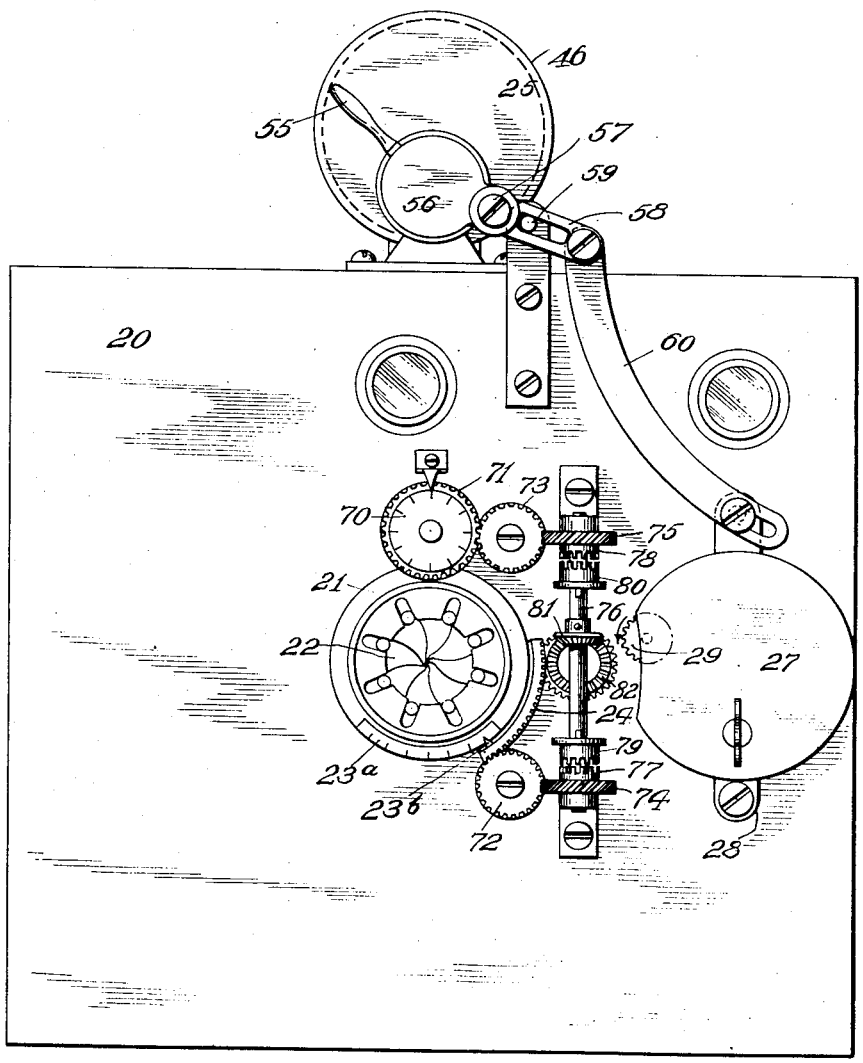

UNITED STATES PATENT OFFICE.

HENRY HESS, OF PHILADELPHIA, PENNSYLVANIA, ASSIGNOR TO HESS-IVES CORPORATION, OF PHILADELPHIA, PENNSYLVANIA, A CORPORATION OF VIRGINIA.

PHOTOGRAPHIC-CAMERA EXPOSING MECHANISM.

1,300,613.  Specification of Letters Patent.  Patented Apr. 15, 1919.

Application filed February 4, 1916. Serial No. 76,127.

*To all whom it may concern:*

Be it known that I, HENRY HESS, a citizen of the United States, residing at Philadelphia, in the county of Philadelphia and State of Pennsylvania, have invented certain new and useful Improvements in Photographic-Camera Exposing Mechanism, of which the following is a specification, reference being had therein to the accompanying drawing.

This invention relates to photographic camera exposing mechanism and more particularly to a camera with the exposing devices of which is combined mechanism for automatically securing the proper exposure, that is admitting the correct amounts of light to the sensitive photographic plate within the camera.

The usual exposure timing adjustments and the adjustable diaphragms require guesswork in setting them for an exposure under any given conditions; but when this element of guesswork is obviated by the employment of so-called sensitometers this introduces the inconvenience of referring to exposure tables, so that the user has the task of first operating the sensitometer and then consulting the tables, and then adjusting the camera to correspond, and then performing the exposure. The main object of the present invention is to afford an automatic mechanism for effecting the correct exposure in operating photographic cameras which obviates the defects and inconveniences of the heretofore suggested expedients.

Another object is to afford automatic control or adjustment of the diaphragm devices, or of the exposure timing device, or of both, whereby the adjustment of the device is automatically increased in a regular or predetermined way from its minimum adjustment to the desired adjustment, varying contrarily to the amount of illumination of the subject. Thus, while the light acts progressively to discolor a sensitive surface, bringing it to a standard depth or shade within a period of time which is shorter with the greater amount of light, the automatic mechanism hereof may progressively adjust the timing device from the minimum time of exposure through successive adjustments until, at the end of the period referred to, the operation ceases and the timing device is then in correct adjustment. Thereupon the user may simply operate the camera to admit light and effect the exposure in the usual way. On the contrary, the automatic mechanism hereof may gradually open the diaphragm from a minimum to the desired size, which is reached at the end of the adjusting operation, the diaphragm therefore presenting a smaller or larger aperture according to whether the light is strong or weak. Or the timing device and the diaphragm device may both be automatically operated, either simultaneously or consecutively, or either one may be set by hand and thereby control the rate of adjustment of the other.

Having thus, in a general way, stated the objects and the nature of the present invention, I will proceed to describe a photographic camera exposing mechanism constituting a convenient illustrative embodiment of the invention. The invention consists in the novel features of principle, operation, construction, combination, arrangement and detail herein shown, described or claimed.

Figure 2:
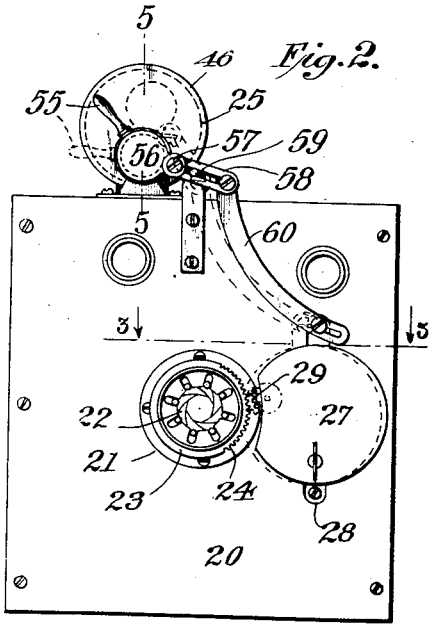
Figure 3:
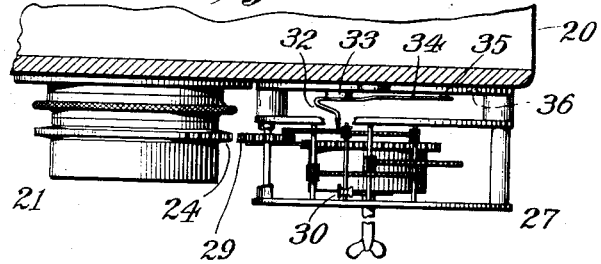
Figure 4:
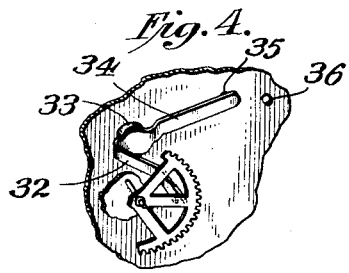

In the accompanying drawings forming a part hereof Figure 1 is a left elevation of a photographic camera provided with an exposing mechanism embodying the principles of the present invention. Fig. 2 is a front view of the camera and mechanism shown in Fig. 1. Fig. 3 is a view partly in plan and partly in section on the plane 3—3 of Fig. 2. Fig. 4 is a perspective view of a detail.

Fig. 5 is a left elevation partly in section on the plane 5—5 of Fig. 2. Fig. 6 is a front view partly in section on the plane 6—6 of Fig. 5. Figs. 7 and 8 are interior details of the sensitometer device. Fig. 9 is a view similar to Fig. 5 of a modification. Fig. 10 is a detail thereof.

Fig. 11 is a view similar to Fig. 2 showing a different or more complete embodiment of my invention.

Broadly the purport of the invention is the automatic regulation of the quantity of light admitted to the camera or the amount of exposure. This regulation may be either by means of the diaphragm device, or the timing device. For example, the timing device may be gradually shifted by the mechanism hereof in a uniform manner from the minimum exposure, of say 1/100 second, gradually through the different larger exposure periods toward the maximum, for example, one second. This may be on the assumption of the standard size of diaphragm aperture. Or the time of exposure could be predetermined and the size of the diaphragm gradually adjusted from a minimum toward maximum. Or the two devices might change adjustment simultaneously, or the operator could switch the mechanism from the diaphragm to the timing devices after a desired enlargement of the diaphragm, or vice versa. One device may be prearranged at different adjustments which would control the extent of adjusting operation automatically performed on the other device.

In any case the total amount of adjustment according to this invention, whether the adjustment be of the diaphragm or of the timing device, or both, is proposed to be controlled mechanically by the aid of an associated exposure measuring device, visually inspected. For convenience, such measuring device will be termed an exposure meter, and this may embody a piece of sensitive paper exposed to the action of light from the direction of the subject to be photographed. When the paper is colored up to a shade corresponding with a standard color associated with the device, the operator may effect the stoppage of the adjustment, which has been going on, and thereupon effect the exposure of the sensitive plate of the camera. For fine accuracy of adjustment the apparatus may be so arranged that a considerable period, say five minutes, is consumed under average conditions in coloring up the sensitive surface to the standard shade. This would be accompanied by a quite slow enlarging adjustment of the timing device or the diaphragm. The operation can be quickened by numerous obvious expedients, not shown herein, for example, the employment of a lighter shade of standard color, or by the concentration of light upon the sensitive paper, or otherwise.

Referring to the particular illustrated embodiment of Figs. 1 to 10, wherein the diaphragm is automatically enlarged during the time that the sensitive paper is becoming discolored to the standard shade, the apparatus comprises the camera box 20 having a suitable lens embodied in mounting 21 at the front. Associated with the lens is an enlargeable diaphragm device 22 which may be of well known type and which is adjustable in size by means of the external ring 23. Turning the ring clockwise in Fig. 2 enlarges the aperture and the aperture in that figure is shown as of a medium size.

Any suitable exposure timing device, such as a bulb-controlled shutter, may be used, and it will be understood, although the same is not illustrated herein because *per se* not constituting an essential part of the illustrated embodiment of the invention. The alternate of an ordinary lens cap might be used, understanding that the lens is to be opened for a predetermined period such as one second.

The automatic mechanism hereof comprises a clockwork or the like, capable of rotating the diaphragm adjusting ring 23 and controlled in a suitable way in conjunction with an exposure meter. As shown, I prefer to employ a single control lever which effects the opening and closing of the exposure meter and also controls the action of the clock work on the diaphragm.

Mounted on top of the camera box is shown a device 25 which may be described as an exposure meter. It may, for example, comprise parts of the commercially known Wynne exposure meter, the same, however, used in a novel manner and with adjuncts, including a light passage or barrel and the diaphragm operating mechanism hereof.

The clockwork 27 is pivoted as a whole to swing bodily about a pivot 28 so that it may be adjusted toward and from the diaphragm ring 23. The ring 23 is provided with gear teeth 24 adapted to mesh with the teeth of a pinion 29 of the clock work train. When operative the pinion 29 is turning counter clockwise, as indicated by the arrow, so that if engaged with the teeth 24 the enlargement of the diaphragm is effected.

The clockwork may be of any desired type and the details need not be elaborated. It may be a fast running mechanism regulated by the action of a butterfly 30, the pinion 29, however, being connected at such part of the train as to rotate slowly, taking a period of say five minutes, to adjust the diaphragm from its smallest to its largest diameter.

Fig. 3, and the full lines in Fig. 2, indicate the clockwork as disengaged from the diaphragm ring, but the dotted lines in Fig. 2 indicate teeth 24 and pinion 29 in engagement. It is only necessary to swing the clockwork from the disengaged position to the engaged position and to maintain it there for the requisite period of time while the diaphragm enlarges, and to then disengage the two.

Obviously such engagement and disengagement of the clockwork could be replaced by merely starting and stopping it, but I prefer the illustrated arrangement since it leaves the diaphragm ring free to be adjusted by hand to its original position after an exposure.

The preferred means for moving the clockwork into and out of engagement will be hereinbelow described. At this point may be mentioned a convenient device to stop the running of the clockwork when disengaged from the diaphragm ring. This is shown in the form of a stop finger 32 which is mounted at 33, Fig. 4, not on the clockwork, but on the camera front. The finger 32 has a rightward extension 34 with a knob 35 at its rear side adapted to engage in a small recess 36 in the rear plate of the clockwork. When the clockwork is thrown to the left into operative position the recess 36 is brought behind the knob 35 so that the knob drops into the recess. When the clockwork is moved to the right from operating position the knob is forced out of the recess which throws the other extremity of the finger 42 slightly to the left, and it engages against one of the clockwork gears, thus effecting the stoppage of the mechanism.

The exposure meter 25, which is best seen in Figs. 5, 6, 7 and 8, consists of a small glass front casing within which is an apertured disk 39 having areas of standard color 40 thereon, and an aperture at 41 behind which is a portion of a sensitive paper 42 adapted to become discolored by the effect of light as seen at 43 and 44. This paper is pressed forwardly against the disk 39 by a device which is capable of rotation so as to bring fresh portions of paper into view.

The entire exposure meter 25 is shown bodily mounted within a recessed supporting member 46, which is clearly seen in Fig. 5, formed with or connected to a forwardly extending barrel 47. This barrel at its forward end is directed toward the subject to be photographed and at its rearward end opens to the portion of the sensitometer comprising the colored areas 40 and the aperture 41 between them behind which is the sensitive paper 42.

In the intended use of exposure meters, such as that herein referred to, the general surrounding light conditions are taken into account, but I prefer to combine an exposure measuring device with means such as the light barrel 47 for restricting the action to that of light received from the general direction of the object or portion of the view to be photographed. On a bright day different portions of a landscape may present different degrees of brightness requiring differences in exposure, and the light barrel or directing tube 47 hereof takes such matters into account.

In order to permit inspection of the darkening sensitive paper and of the standard colors adjacent to it, I have provided an inclined transparent mirror 48 just beneath a lateral aperture 49 in the side of the barrel. By inspection through the aperture 49 a comparison may be made between the sensitive paper and the standard color.

To permit closing the opening 49, I have shown a revoluble sleeve or tube 50 surrounding the light barrel and supported in a bearing 51. This sleeve is provided with an opening 52 which may be put into register with the opening 49.

The barrel 47 and the tubular sleeve 50 are shown both extending forwardly a suitable length, and they are kept in alinement by means of a pin 53 fast on the sleeve 50 engaging a slot 54 in the barrel 47. The pin is shown as extending outwardly from the sleeve forming a convenient handle 55 by which the sleeve may be rotated on the barrel.

Therefore, by this handle the openings 49 and 52 may be brought into alinement. Also the motion effected by the handle 55 may be made to produce an opening and closing of the front of the light barrel. A door 56 consisting of a circular plate is shown pivoted at 57 to a lug at the right side of sleeve 50 and is provided with a slotted extension 58 engaging a fixed pin 59.

The door 56 is shown closed in Fig. 2 in full lines, but if the handle 55 be swung from the full line to the dotted line position this rotates the sleeve 50 and causes the pivot 57 to rise, thus swinging the parts to the dotted line position shown.

The lever 55, therefore, serves to open and close the door of the exposure meter as well as to bring the openings 49 and 52 into and out of alinement.

In fact, I propose to employ the handle 55 as the controlling lever of the apparatus and to so connect it up that when it is thrown for opening the door 56 it will also bring the clockwork 27 into operation. In this way the lever simultaneously puts the exposure meter and the clockwork into action. To this end a link 60 is shown extending from the extremity of the extension 58 to a stud at the upper end of the clockwork 27. The end of the link 60 is slotted in order to avoid giving too great a swinging movement to the clockwork which requires only the small motion indicated.

Instead of surrounding the barrel 47 with a sleeve having an opening, the parts may be constructed, as in Fig. 9, where the barrel $47^a$ is square in cross section, and a permanently open aperture 49 is employed, having a yellow glass insert 64 which permits inspection but prevents discoloration by light entering through the aperture. The barrel $47^a$ is formed with its front end circular in cross section so as to permit a collar 65 to be mounted thereon, having a handle 55 and pivot 57 corresponding to the same parts in the other figures.

While it is preferable to throw the lever back and thereby stop the adjustment of the diaphragm before the camera shutter is operated to make the exposure, it is obvious that this is unnecessary, since the exposure might be made while the diaphragm is in process of enlarging.

The operation of the mechanism may be substantially as follows: The exposure meter having been set with a fresh portion of sensitive paper 42 behind the aperture 41, and the barrel door 56 being closed, and the lever 55 elevated, and the clockwork 27 silent, the operator sets the diaphragm 22, which is shown as an iris diaphragm, to its minimum size. The camera is then set in the direction in which the photograph is to be taken. The lever 55 is then thrown down from the full line to the dotted line position of Fig. 2. This simultaneously uncovers the inspection opening 49 and opens the barrel door 56 and swings the clockwork 27 toward the lens casing and diaphragm. The moment the light barrel is opened the light from the general direction of the object to be photographed enters and commences discoloring the sensitive paper at a speed depending upon the amount of light on the subject. From time to time the operator may inspect the progress of the sensitive paper and make comparison with the standard by the inspection opening. In the meanwhile the clockwork, having been thrown into mesh with the diaphragm ring and having been released from its stop device, has started into action and has commenced at a predetermined speed effecting the progressive enlargement of the diaphragm. It is now merely necessary, when the proper discoloration has been attained, to throw the lever 55 back to its upper position which closes the barrel door and at the same time disengages and stops the clockwork, leaving the diaphragm set to the proper degree of enlargement for the given exposure.

Referring now to the embodiment of Fig. 11, this shows not only an enlargeable diaphragm actuable by clockwork as a means of regulating exposure, but also a timing device actuable by the same clockwork, connections being such that the user may cause the clockwork to effect the enlargement either of the aperture or of the time of exposure, or the enlargement of both of them.

In this embodiment the device for enlarging the diaphragm 22 is shown as comprising a fixed scale 23ª along which an index 23ᵇ may be moved by hand in a well known manner. Gear teeth 24 are provided, as in the other embodiment, but they are secured in this instance to the index 23ᵇ. At the top of the camera we have the exposure meter 25, as before, and at the front of the camera the clockwork 27 with its operating pinion 29.

Additionally Fig. 11 shows a speed control device 70, this being in the nature of an index consisting of a dial revoluble by hand in a well known manner so as to bring different portions thereof opposite to a fixed index. Circular adjustment of the dial alters the time of exposure.

The speed control device 70 is shown as provided with peripheral gear teeth 71.

Mechanism by which either or both of the devices, that is, the diaphragm enlarging device and the exposure period enlarging device, may be actuated is conveniently as follows. A toothed gear 72 engages the teeth 24 for enlarging the diaphragm and a similar toothed gear 73 engages the teeth 71 for increasing the time of exposure. Helical gears 74 and 75 respectively engage the gears 72 and 73. The helical gears are both loosely mounted on a vertical spindle 76. Clutch teeth 77 and 78 are connected with the helical gears 74 and 75 respectively. Clutch members 79 and 80 are splined to the spindle 76 and are arranged respectively to co-operate with the clutch members 77 and 78. By closing either clutch device 77, 79, or 78, 80, the spindle 76 is placed in gear either with the diaphragm or with the exposing shutter. A bevel gear 81 on the spindle engages a bevel gear 82, which is also provided with peripheral teeth, arranged to be engaged by the operating pinion 29 when the clockwork 27 is shifted into operative position.

With this apparatus the different operations may be performed. For example, the lower clutch 77, 79 may be closed and the upper clutch 78, 80 opened. The apparatus then is substantially identical with that shown in Figs. 1 to 8. The following further operations, adjustments or arrangements may, however, be effected.

The purpose of the invention being to control the total amount of light admitted to the camera in accordance with the indications of the exposure meter, such result may be obtained, not only in the manner before described, but by a reversal of the clutches so that when the exposure meter is opened the timing device 70 is gradually shifted to enlarge the time of exposure. When the exposure meter indicates that the proper adjustment has been attained, the exposure is made, the timing device controlling the time of exposure and therefore the amount of light admitted.

With this operation it is to be understood that the diaphragm has been previously set to some standard aperture, just as the timing device was assumed to be set to some standard time of exposure, when the present invention was used for enlargement of diaphragm.

Different conditions will dictate different uses of the apparatus. When great sharpness of detail is demanded a predetermined small aperture will be used, and the time of exposure automatically increased to the proper amount. On the contrary, for soft effects or at other times when a short exposure is desirable and a large aperture, the timing device 70 will be set at a predetermined adjustment and the present invention used to enlarge the diaphragm.

A third employment of the invention is to close both the upper and lower clutches so that neither the time of exposure nor the aperture will be a minimum, but both will be proportionately enlarged.

Various further desirable results are attainable by the possibility of hand adjustment of either or both of the devices 22 and 70 into designated initial adjustments prior to the automatic enlargement of either or both of them.

I not only claim the light barrel hereof to be novel, but the use of a control handle for opening and closing the same, and also the employment of a clockwork put into and out of operation by the same act which opens and closes the light barrel. Such clockwork may be used either to enlarge the diaphragm, as shown, or to adjust the exposure timing device.

It will be seen that I have described embodiments containing the principles and securing the objects and advantages of the present invention, and further advantages will be apparent to those skilled in the art. Since many matters of arrangement, design, combination, detail and other features may be variously modified without departing from the underlying principles, I do not wish to be restricted to such features, excepting so far as set forth in the appended claims.

What I claim is:

1. Photographic camera exposing mechanism, including, in combination with the camera exposure means, including an adjustable diaphragm device and an adjustable timing device, and an exposure meter, a driving motor adapted to run at a predetermined rate, control means for rendering the motor operative or inoperative at will, connections between the motor and exposure means actuated from the motor when operative for simultaneously progressively adjusting the exposure diaphragm device and the exposure timing device, and connections between said motor control means and the exposure meter for also setting in operation the exposure meter simultaneously with rendering the motor operative.

2. Photographic camera exposing mechanism, including, in combination with the camera exposure means, including an adjustable diaphragm device and an adjustable timing device, and an exposure meter, a driving motor adapted to run at a predetermined rate, control means for rendering the motor operative or inoperative at will, connections between the motor and exposure means actuated from the motor when operative for progressivey adjusting the exposure timing device, and connections between said motor control means and the exposure meter for also setting in operation the exposure meter simultaneously with rendering the motor operative.

3. Photographic camera exposing mechanism, including, in combination with the camera exposure means, including an adjustable diaphragm device and an adjustable timing device, and an exposure meter, a driving motor adapted to run at a predetermined rate, control means for rendering the motor operative or inoperative at will, connections between the motor and exposure means actuated from the motor when operative for progressively adjusting the exposure diaphragm device, and connections between said motor control means and the exposure meter for also setting in operation the exposure meter simultaneously with rendering the motor operative.

4. Photographic camera exposing mechanism, including, in combination with the camera exposure means, including an adjustable diaphragm device and an adjustable timing device, a driving motor adapted to run at a predetermined rate, control means for rendering the motor operative or inoperative at will, and connections between the motor and exposure means actuated from the motor when operative for simultaneously progressively adjusting the exposure diaphragm device and the exposure timing device.

5. Photographic camera exposing mechanism, including, in combination with the camera exposure means, including an adjustable diaphragm device and an adjustable timing device, a driving motor adapted to run at a predetermined rate, control means for rendering the motor operative or inoperative at will, and connections between the motor and exposure means actuated from the motor when operative for progressively adjusting the exposure diaphragm device.

6. Photographic camera exposing mechanism, including, in combination with the camera exposure means, including an adjustable diaphragm device and an adjustable timing device, a driving motor adapted to run at a predetermined rate, control means for rendering the motor operative or inoperative at will, and connections between the motor and exposure means actuated from the motor when operative for progressively enlarging the adjustment of the exposure timing device.

7. Photographic camera exposing mechanism, including, in combination with an exposure means and an exposure meter, a driving motor adapted to run at a predetermined rate, control means for rendering the motor operative or inoperative at will, connections between the motor and exposure means actuated from the motor when operative for progressively adjusting the exposure means, and connections between said motor control means and the exposure meter for also setting in operation the exposure meter simultaneously with rendering the motor operative.

8. Photographic camera exposing mechanism, including, in combination with the camera exposure means, including an adjustable diaphragm device and an adjustable timing device, and an exposure meter, a driving motor adapted to run at a predetermined rate, control means for rendering the motor operative or inoperative at will, and connections between the motor and exposure means actuated from the motor when operative for adjusting the exposure means.

In testimony whereof, I have affixed my signature hereto.

HENRY HESS.